April 18, 1967  A. G. H. VANDERPOEL  3,314,230
EXHAUST MANIFOLD AFTERBURNER
Filed March 24, 1965  2 Sheets-Sheet 1

INVENTOR.
ALBERT G. H. VANDERPOEL
By White & Haefliger
ATTORNEYS.

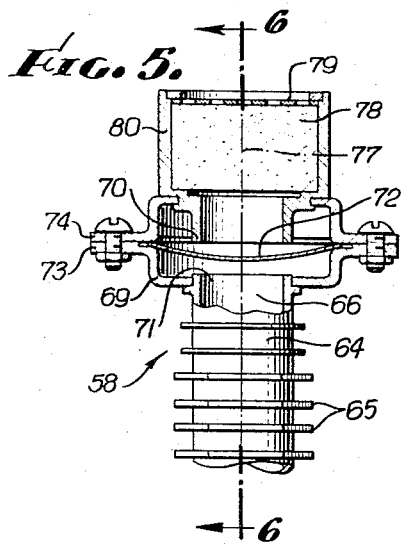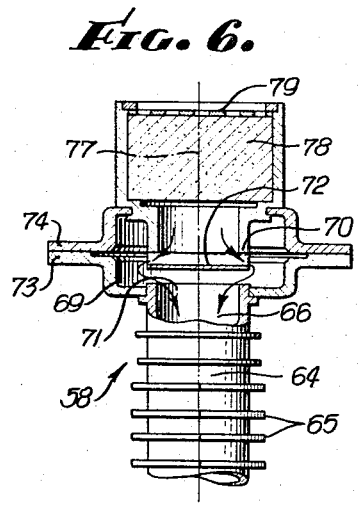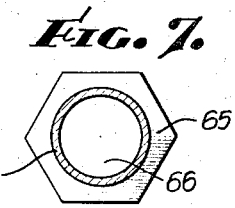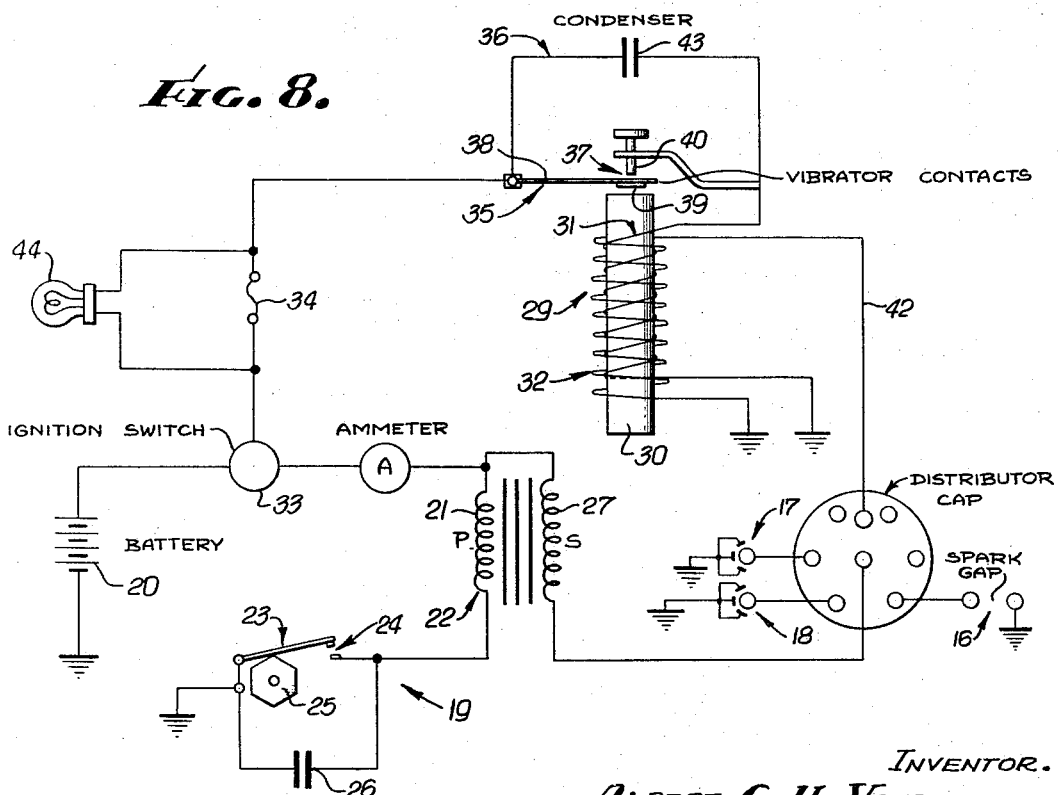

United States Patent Office 3,314,230
Patented Apr. 18, 1967

1

3,314,230
EXHAUST MANIFOLD AFTERBURNER
Albert G. H. Vanderpoel, 14509 Van Ness Ave.,
Gardena, Calif. 90249
Filed Mar. 24, 1965, Ser. No. 442,258
2 Claims. (Cl. 60—30)

This invention relates generally to internal combustion engine exhaust and ignition systems, and more particularly concerns improvements in such systems whereby benefits concerning engine operation and reduced air pollution are achieved. As will be brought out, the invention concern the introduction of air into the engine exhaust manifold in an unusually efficient manner, and the ignition of the air diluted combustible mixtures within the exhaust manifold or within the engine cylinder itself.

In the past devices have been constructed for introducing air into the engine exhaust manifold; however none of such devices of which I am aware have resulted in the various combinations of benefits flowing from the present invention. Among these are the provision for substantially higher air in-flow to the exhaust manifold by means of a device having fewer and simpler parts; the provision for air injection to the exhaust manifold at higher engine speeds while maintaining the benefits of such injection at such higher speeds, including the evening-up of compression pressures within the cylinders; the achievement of better and more complete combustion of the mixtures flowing through the engine and also more complete scavenging in the exhaust manifold resulting in less air pollution; the enablement of several degrees of spark advance for better engine operation; a provision of an air injection device less subject to failure, as for example is enhanced by better cooling of the device; and the maintenance of a cleaner engine, i.e. with fewer carbon and other deposits forming within the cylinder and manifold system.

As will appear, attainment of the above advantages comprises a major object of the invention. As regards the system aspects of the invention, the latter includes an air injector body containing an air passage and having an air discharge terminal adapted for connection to the engine exhaust manifold, means to control air flow through the body to the exhaust manifold, and means to ignite a combustible mixture of fuel and air during flow of unburned fuel from the engine cylinder and within the exhaust manifold. Typically, the last-mentioned means includes a spark plug connected to the manifold and having electrodes exposed to the interior thereof, although in another form of the invention the plug has electrodes exposed to the engine cylinder interior. In this regard a source of high voltage pulses is typically electrically connected to the plug for ignition device, as for example is described in my U.S. Patent 3,165,099.

As regards the improved air injection device itself, it typically includes a body containing an air passage and having an air discharge terminal adapted for connection to the exhaust manifold and an air inlet spaced from said terminal, control means including a valve carried by the body to control air flow through the body passage to the exhaust manifold in response to exhaust pressure fluctuations communicable to the valve, the valve comprising a reed carried at the downstream side of a seat and in

2 such overlying relation thereto as to flex away from and toward the seat to control air flow therethrough in response to exhaust pressure fluctuations. Typically, the seat projects downstream within the body to pass air therethrough and the body passage extends at the outer side of the seat to receive air flowing laterally between the reed valve and seat when the reed is flexed away from the seat. Also, the body is flanged to closely support opposite end portions of the reed valve transversely outwardly of the seat, and in such manner that the reed valve is free to rotate about an axis defined by the passage during valve flexing.

These and other objects and advantages of the invention, as well as the details of illustrative embodiments, will be more fully understood from the following detailed description of the drawings in which:

FIG. 5 is a fragmentary view showing the flexing action of the reed valve in the air injector device;

FIG. 6 is a vertical section taken on line 6—6 of FIG. 5;

FIG. 7 is a section taken on line 7—7 of FIG. 3; and

FIG. 8 is a circuit diagram showing one manner for providing ignition pulses to the spark plug.

Figure 1:
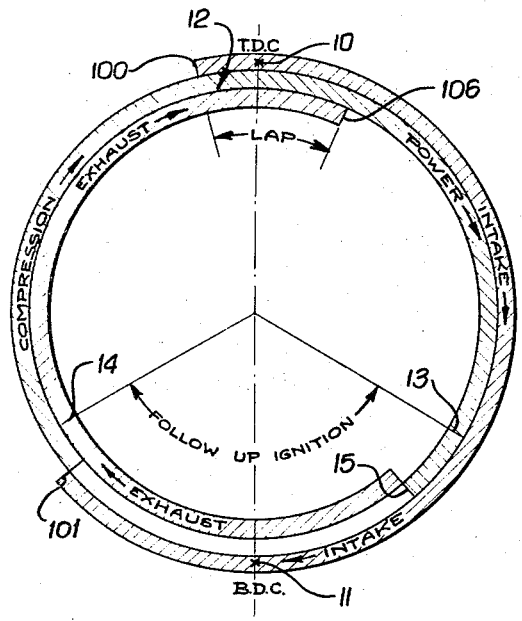
FIG. 1 is a crankshaft diagram correlated to the air injection and ignition action of the system.

Referring first to FIG. 1 the principles of the invention may be explained as related to the crankshaft diagram wherein it will be understood that the stroking of the piston is represented by clockwise travel between top dead center location 10 and bottom dead center location 11.

Intake of fuel and air to the cylinder may occur between locations 100 and 101, and compression of the unignited charge takes place between locations 101 and primary ignition general location 12. The power stroke then commences, and the exhaust port opens at 15. Meanwhile, follow-up or secondary ignition within the cylinder commences during the power stroke, as for example at the point 13 on the diagram. Such follow-up ignition continues during the power stroke and to point 14 on the diagram, i.e. after opening of the exhaust port. The exhaust continues until point 106 on the diagram is reached, there being angular overlap between intake opening and exhaust closure as defined by the angle between points 100 and 106. The angular dimensions recited are merely typical, and may be varied so long as the desired results of higher economy and more complete combustion are maintained.

Referring to FIG. 8, and as described in my prior patent referred to above, primary ignition will be understood as produced at the sprak plug electrodes certain of which are shown at 16, 17 and 18 as a result of voltage pulses transmitted from the means generally shown at 19. It includes a battery 20 connected in series with the primary coil 21 of the transformer 22, and with the switch 23, the breaker points 24 of which are typically opened and closed in response to rotation of the engine driven cam 25. A condenser 26 is connected across the switch 23 to reduce arcing at the contacts or points 24.

The secondary 27 of the coil 22 is connected to what may be characterized as other means for transmitting the pulses to initially ignite the combustible mixture in the engine cylinder as a result of primary sparking. Such other means also functions to transmit pulses effecting secondary sparking at the electrodes during expansion of the initially ignited charge in the cylinder. For this purpose, means is provided for creating voltage pulses to produce such secondary sparking at the plug electrodes, one such means being generally indicated at 29 in the form of a vibrator. As illustrated, the vibrator includes an iron core 30 around which extend primary and secondary windings 31 and 32. The primary winding 31 is connected with the battery 20 through the ignition switch 33, a fuse 34, and a parallel circuit which includes branches 35 and 36. The branch 35 includes a switch 37 which is repeatedly opened and closed in response to vibrator action, and for this purpose the switch may include a spring arm 38 supporting contact 39 and biasing the contact into engagement with adjustable contact 40, whereby when the ignition switch is turned on, current surges through the branch 35 and through the primary winding 31 to energize magnetically the core 30. As a result, the arm 38 is drawn downwardly by attraction toward the pole 41 of the core 30, opening the switch contacts and breaking the circuit. Thereafter, the arm 38 biases the contact 39 back into engagement with contact 40 to reestablish current flow through the branch 35, these actions occurring at a high frequency and resulting in the induction and transmission of high voltage pulses from the secondary 32 through lead 42. The condenser 43 in the branch 36 serves to reduce arcing at the contacts 39 and 40.

A telltale light bulb is shown at 44 as connected across the fuse 34 in such relation that the bulb will not light during correct operation of the vibrator 29. If the latter malfunctions for any reason, as for example if the contacts 39 and 40 burn out or the coil 31 becomes defective, the fuse 34 will break, and the bulb 44 will light, warning the operator that the engine afterburner is not operating and needs attention.

The above description concerning FIG. 8 has to do with one way of providing ignition pulses to spark plugs having electrodes exposed within the engine cylinder. As will be brought out below, such pulses are effective to ignite any combustible mixture within the cylinder following the opening of the exhaust port and prior to closing thereof, during which period the cylinder communicates with the exhaust manifold into which air is injected. This may be better understood by further reference to FIG. 1 wherein it is seen that follow-up ignition continues past point 15 at which the exhaust port opens. As the exhaust leaves the cylinder and mixes with air in the exhaust manifold, it is further supplied with follow-up ignition pulses in the cylinder for igniting the exhaust both in the cylinder and in the exhaust manifold, air dilution of the exhaust also promoting better and more complete combustion of the gases flowing from the engine, of particular importance during idle and heavy load conditions.

Figure 2:
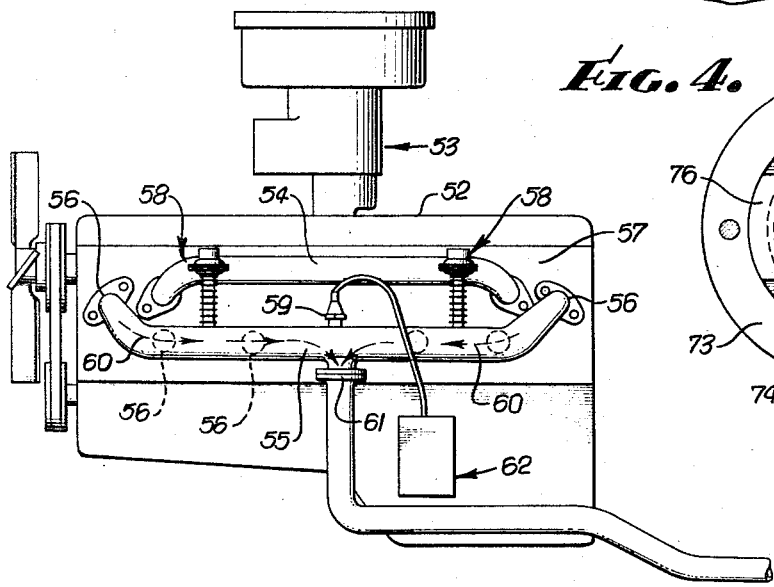
FIG. 2 is a side elevation showing an engine incorporating the invention.

Referring now to FIG. 2, an engine is shown at 52 having an air and fuel carburetion or mixing device 53 and air and fuel intake manifold 54, and an exhaust manifold 55. The latter has inlets 56 proximate the exhaust valves contained within the engine block 57. Air injection devices are shown at 58 as having connection with the exhaust manifold 55, and in this form of the invention a spark plug 59 is shown as having connection to the manifold 55 downstream of the devices 58. Thus, the hot exhaust flows in the direction of the arrows 60 and toward the tail pipe connection at 61, the plug 59 being located proximate that connection, and with electrodes exposed to the interior of the manifold. As a result, the hot gases arriving in proximity to the plug electrodes are diluted with air entering through the devices 58, with sufficient mixing as to enable the plug to ignite any combustible mixtures flowing to the tail pipe. Advantage is here taken of the high heat content of the gases, promoting their capacity for further burning of fuel as a result of sparking pulses transmitted to the plug electrodes. A source of such pulses is indicated generally at 62, and may comprises a vibrator of the general form as described in connection with FIG. 8 although other vibrators may be used. It is contemplated that the plug would operate continuously to produce a continuous train of sparks at the electrodes for igniting any combustibles within the exhaust manifold.

Referring now to FIGS. 3 through 7, the improved air injector device 58 includes a hollow cylindrical body 64 provided along its length with spaced fins 65, the body and fins being metallic. The body contains an air passage 66 and has an air discharge terminal 67 which is typically threaded at 68 and thereby adapted for connection to the exhaust manifold 55.

The body includes a chamber 69 which is enlarged in relation to the passage 66 and spaced from the terminal 67. Within the chamber a valve seat is provided at 70 to project relatively downstream and to pass air through the chamber and directly toward the passage inlet 71. A reed valve plate 72 is carried at the downstream side of the seat in such over-lying relation thereto as to flex away from and toward the seat to control air flow therethrough in response to exhaust pressure fluctuations communicated to the valve plate.

Figure 3:
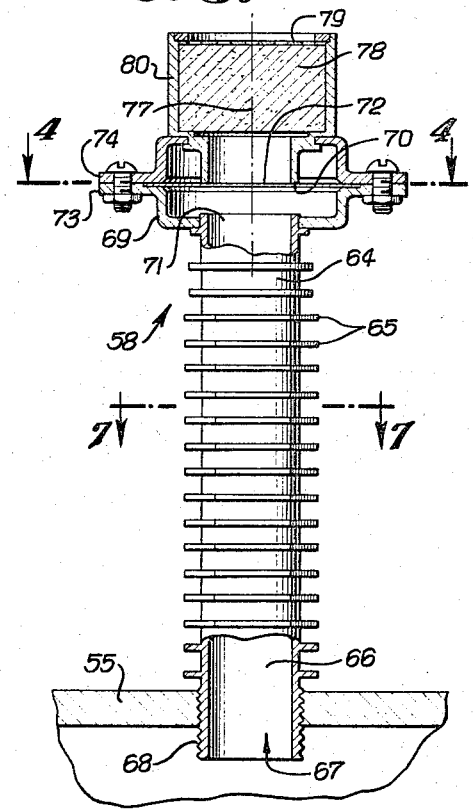
FIG. 3 is an enlarged vertical section taken through the improved air injector device.

Typically, the chamber 69 is flanged at 73 and 74, with annular relief provided at 75 between the flanges for reception of the opposite end portions 76 of the valve plate 72, all in such manner that the valve plate is free to rotate about the axis 77 defined by the passage 66, while at the same time the plate is retained to flex toward and away from the seat. This construction permits more efficient flexing of the valve with accompanying opening and closing action, and better seating of the valve during such flexing, in controlling relation to air flow. Further, the enlargement of the chamber 69 at the outer side of the seat 70, and in both axial directions from the seat, permits of greater volumetric air injection, the air flowing laterally between the reed valve and seat and into the chamber 69 during the time that the entire chamber is subjected to suction communicated from the manifold 55. Typically the plate 72 is only a few thousandths of an inch thick, as for example between .002 and .005 inch, and is made of hard beryllium copper, the plate being relatively free to rotate and to float, as for example is illustrated in FIGS. 3, 5 and 6, during flexing thereof. Upstream of the seat 70 is a filtering and silencing material, as for example a suitable cellulose or sponge 78. The latter is retained in place by a perforated disc 79 which is removable from the device cap 80.

Figure 4:
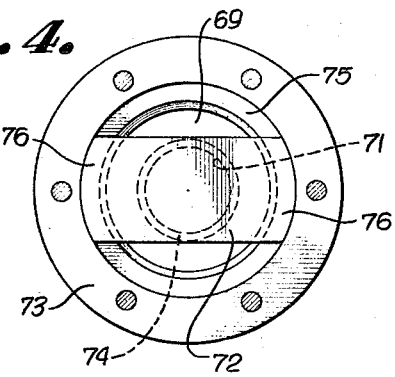
FIG. 4 is a section taken on line 4—4 of FIG. 3.

Referring again to the operation of the reed valve, during an exhaust pressure wave, the reed will shut-off atmospheric air injection by closing against the seat 70, but due to the enlargement of chamber 69, some of the pressure is maintained at both sides of the reed, i.e. outwardly of the seat. When the vacuum waves occur, the external atmospheric pressure pulses the existing pressure on the reed face 82 as seen in FIG. 4 will force the reed off its seat, and thus allow a faster and more efficient opening of the valve. This permits more air to enter the exhaust manifold at high as well as low frequencies. Furthermore, the size of the reed allows it to dissipate heat quite satisfactorily.

I claim:

1. In sub-combination, an air injector body containing an air passage and having an air discharge terminal adapted for connection to an internal combustion engine exhaust manifold and an air inlet spaced from said terminal, a valve seat projecting relatively downstream within said body to pass air therethrough, and a reed valve carried at the downstream side of said seat in such overlying relation thereto as to flex away from and toward the seat to control air flow therethrough in response to exhaust pressure fluctuations communicated to said valve, a portion of said passage extending at the outer side of said seat to receive air flowing laterally between said reed valve and seat when the reed valve is flexed away from the seat, the body formed to loosely support opposite end portions of the reed valve transversely outwardly of the seat, the valve being free to rotate about an axis defined by said passage during said valve flexing.

2. The sub-combination of claim 1 including an air filter carried by said body in the path of air flow therethrough and at the upstream side of said reed valve.

References Cited by the Examiner
UNITED STATES PATENTS

| | | | |
|---|---|---|---|
| 2,345,569 | 4/1944 | Flint | 60—30 |
| 2,772,147 | 11/1956 | Bowen. | |
| 2,851,852 | 9/1958 | Cornelius | 60—30 |
| 2,866,839 | 12/1958 | Kaehni | 123—148 |

MARK NEWMAN, *Primary Examiner.*

RALPH D. BLAKESLEE, *Examiner.*